US005721850A

United States Patent [19]
Farry et al.

[11] Patent Number: 5,721,850
[45] Date of Patent: Feb. 24, 1998

[54] METHOD AND MEANS FOR NAVIGATING USER INTERFACES WHICH SUPPORT A PLURALITY OF EXECUTING APPLICATIONS

[75] Inventors: Mohsen Farry, Calabasas, Calif.; Teresa D. Huxford, St. Louis, Mo.

[73] Assignee: Quotron Systems, Inc., Los Angeles, Calif.

[21] Appl. No.: 479,792

[22] Filed: Jun. 7, 1995

Related U.S. Application Data

[63] Continuation of Ser. No. 5,903, Jan. 15, 1993, abandoned.

[51] Int. Cl.[6] ............................................. G06F 3/14
[52] U.S. Cl. ................................... 395/346; 395/352
[58] Field of Search ........................... 395/155, 161, 395/156, 157, 159, 160, 346, 326, 333, 335, 339, 352, 354; 345/119, 145, 146, 902

[56] References Cited

U.S. PATENT DOCUMENTS

| | | | |
|---|---|---|---|
| 4,680,729 | 7/1987 | Steinhart | 345/902 X |
| 4,692,858 | 9/1987 | Redford et al. | 395/333 |
| 4,821,211 | 4/1989 | Torres | 395/357 |
| 4,862,389 | 8/1989 | Takagi | 395/354 |
| 4,862,390 | 8/1989 | Weiner | 395/352 |
| 4,975,690 | 12/1990 | Torres | 345/119 |
| 5,121,477 | 6/1992 | Koopmans et al. | 395/333 |
| 5,179,700 | 1/1993 | Aihara et al. | 395/326 |
| 5,181,029 | 1/1993 | Kim | 341/20 |
| 5,220,675 | 6/1993 | Padawer et al. | 395/335 X |
| 5,287,514 | 2/1994 | Gram | 395/333 |
| 5,525,978 | 6/1996 | York et al. | 395/349 |

OTHER PUBLICATIONS

Microsoft Windows User's Guide for the Windows Graphical Environment, version 3.0, 1985–1990, pp. 28, 79–98, 407–408, 456–457, 473–476.

*Primary Examiner*—Raymond J. Bayerl
*Assistant Examiner*—Crescelle N. dela Torre
*Attorney, Agent, or Firm*—Baker, Maxham, Jester & Meador

[57] ABSTRACT

Navigation through application program operation, application window configuration, and application program symbol input is provided in a navigator function which executes in response to key strokes designating key representations of application programs and commands.

6 Claims, 9 Drawing Sheets

METHOD AND MEANS FOR NAVIGATING USER INTERFACES WHICH SUPPORT A PLURALITY OF EXECUTING APPLICATIONS

This application is a continuation of application Ser. No. 08/005,903, filed Jan. 15, 1993, now abandoned.

BACKGROUND OF THE INVENTION

The invention concerns a computer user interface which supports multiple parallel execution of a plurality of application programs ("applications"). In particular, the invention concerns a navigation scheme using a minimum number of keystrokes or mouse clicks in a user interface which supports parallel execution of a plurality of application programs.

Many commercially available user interfaces which are based upon windowing schemes support simultaneous execution of several applications. Each executing application may be provided with a window which affords a user the means to provide input to the executing application and to receive output from it. In the available windowing schemes, even though several applications can be running simultaneously, each updating its respective window, only one application window can receive keyboard input. This window is called the "active" window. Navigation in this context refers to the ability to switch windows, making one window inactive and another window active.

The normal navigation method employs a mouse. One or more applications may be activated at initial loading time or later by clicking on an icon. Each executing application is allocated a window. Activation of a window requires use of the mouse to move a cursor from an active window to another window, and depressing a function button on the mouse ("clicking the mouse") to activate a new window.

Currently, the keyboard may also be used to switch between windows by use of a dedicated function key (such as CTRL-ESCAPE) which activates a menu listing all currently-running applications. Arrow keys are then used to move the cursor to an application program name and the ENTER key (or some equivalent) is pressed to activate a new application. This normally requires three key strokes and a like number of shifts in the user's attention between the keyboard and the display screen.

Another drawback of current navigation schemes which provide multiple windows for multiple applications is the requirement to input separately through each window to elicit responses from multiple applications. Even when simultaneously-executing applications understand a single prompt, a separate copy of the prompt must be input to each application through its particular window.

Last, given the frequent reconfiguration of a display in a user interface that supports parallel execution of applications, there is a manifest need to navigate forward and backward through screen configurations if the user wishes to return to an earlier configuration after changing the display.

SUMMARY OF THE INVENTION

The primary objective of the present invention is to provide an efficient and effective navigation scheme for a user interface which supports a plurality of simultaneously-executing applications.

A principal advantage provided by the invention is the provision of such a navigation scheme which uses a minimum number of keystrokes or mouse clicks.

The invention is practiced in an interactive computer system having a keyboard, a display, and a menu driven interface capable of initiating execution of one or more application programs and capable of confining the display of data produced during execution of an application program to a particular window on the display. The method is practiced by:

displaying a navigation window for specifying application programs;

displaying in the navigation window:
  a plurality of application icons, each application icon representing an executable application program; and
  one or more key representations adjacent to each icon, each key representation including one or more keyboard characters and each key representation corresponding to the application program represented by the adjacent icon;

entering a first key representation by striking one or more keys on the keyboard; and initiating execution of a particular application program corresponding to the first key representation and activating a first window for the particular application program in response to entry of the first key representation.

In the method, a second key representation is entered by striking one or more keys of the keyboard, execution of another particular application program is initiated and a second window is activated. In this regard, the method further includes:

displaying a single global symbol entry window for specifying application program symbol input;

entering a symbol into the global symbol entry window;

dispatching the symbol to the particular application programs; and displaying application program responses to the symbol in the first and second application windows.

In the interactive computer system, the interface further includes means for establishing and modifying window characteristics and the system further includes a capability to open and maintain files. Relatedly, the method further includes:

configuring characteristics of the first and second windows;

saving the characteristics of the first and second windows in a configuration file;

changing the characteristics of the first window;

generating a REVERT command; and in response to the REVERT command, changing the characteristics of the first window to those in the configuration file.

BRIEF DESCRIPTION OF THE DRAWINGS

The foregoing and other objects, aspects, and advantages of the invention will be better understood from the following detailed description of the preferred embodiment of the invention with reference to the drawings, in which.

DETAILED DESCRIPTION OF THE PREFERRED EMBODIMENT

Figure 1:
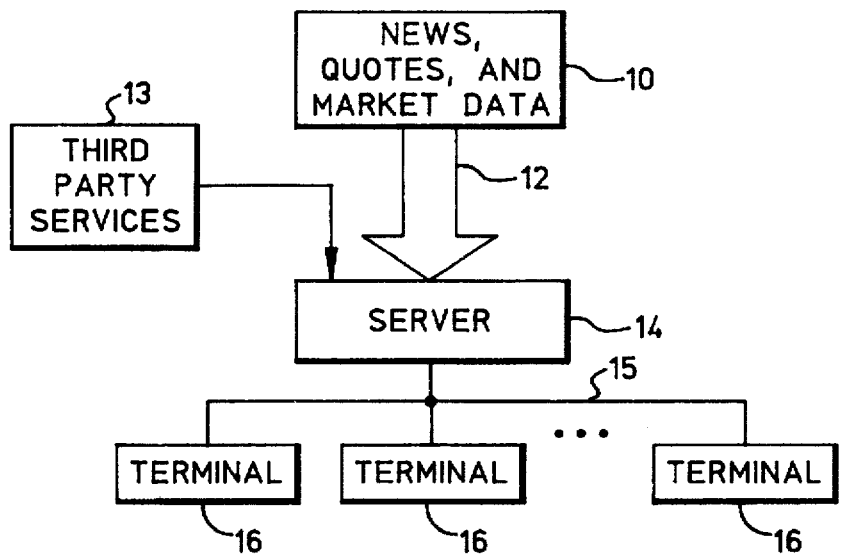
FIG. 1 is a block diagram illustrating the application environment of the invention.

FIG. 1 illustrates the operational environment of the invention. The invention operates in a system that provides a variety of financial data services to subscribers through desktop terminals that access a commercial database. The terminals also display other information received from local connections independent of the commercial database. Trading information from various exchanges, news services, and private databases flows into a national computer center 10 over conventional means (which are not illustrated). In the national computer center 10 the information is processed to form a file of transaction and quotation data. Derived files of statistics on individual securities and markets are also maintained. Additional files of data useful to a subscriber are maintained, including dividend, earnings, and forecasting information for a variety of financial instruments, including stocks and bonds.

The national computer center 10 is connected through an information transmission structure 12 including transmission lines, regional data centers, and concentrator sites (all not shown). Other services, independent of the financial data are provided from third party services 13 by conventional means. At a typical subscriber's site, a subscriber server 14 is connected to the information transfer structure 12 and third party services 13 and through a local area network 15 to a plurality of branch terminals 16. Preferably, the server 14 is a UNIX-based machine and the terminals are DOS-based personal computers which run a commercially-available user interface such as the WINDOWS system available from Microsoft. (UNIX is a trademark of UNIX Laboratories; WINDOWS and MICROSOFT are trademarks of Microsoft.) The architecture of a branch terminal such as the terminal 16 is illustrated in FIG. 2.

Figure 2:
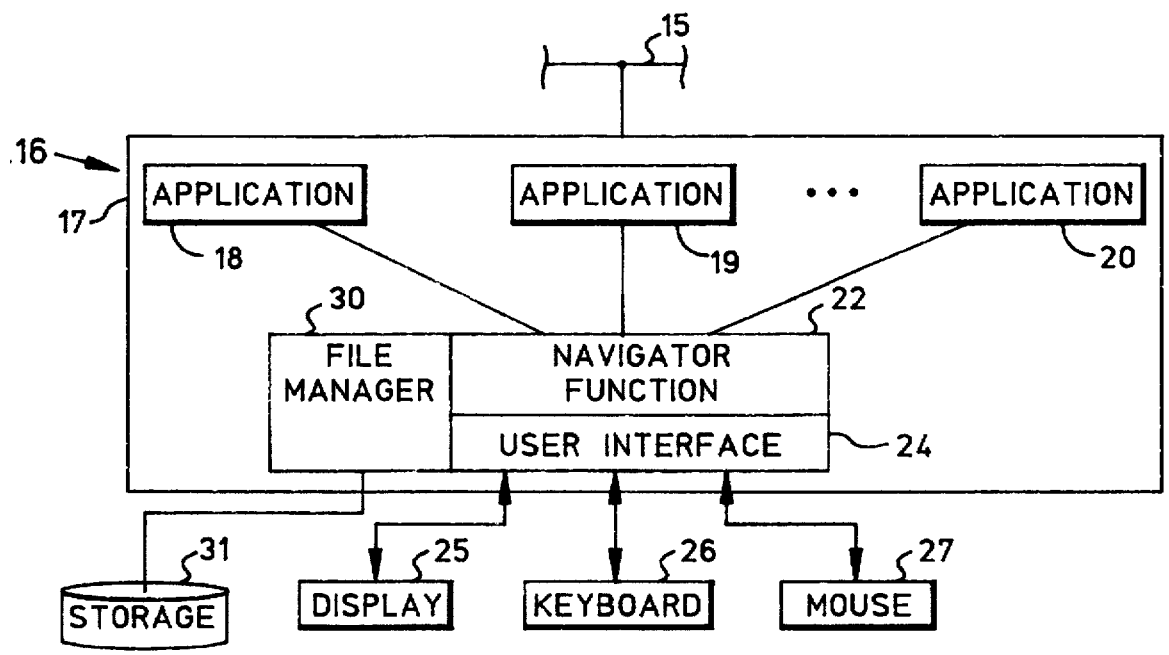
FIG. 2 is a block diagram illustrating the structure of a terminal in which the invention is practiced.

In FIG. 2, the terminal 16 includes a commercially-available DOS-based personal computer 17 which is capable of supporting the concurrent execution of a plurality of application programs 18, 19, and 20. The application programs 18–20 are interfaced through a navigator function 22 that is joined conventionally to a user interface 24 (such as the WINDOWS system). The user interface 24 is a typical software system which allows a user to directly manipulate the application programs 18, 19, and 20 by means of conventional I/O devices such as a CRT display 25, a QWERTY keyboard 26, and a mouse 27.

The user interface 24 operates conventionally as a windowing system such as that described in Chapter 13 of V. J. Mayhew's PRINCIPLES AND GUIDELINES IN SOFTWARE USER INTERFACE DESIGN (USA: Prentiss-Hall, 1992), pp. 437–457. The operational capability of a user interface of the windowing system type is fundamental to, but distinct from, the invention. The user interface 24 includes conventional means for initiating and managing application program execution and for initiating, managing, activating, and deactivating application windows on the display 25.

The invention also assumes the existence of a file manager 30 which opens, maintains, and closes files on behalf of the navigator function 22 and the user interface 24. The file manager 30 operates in conjunction with one or more peripheral storage devices such as the direct access storage device (hard disk drive) 31.

Figure 3:
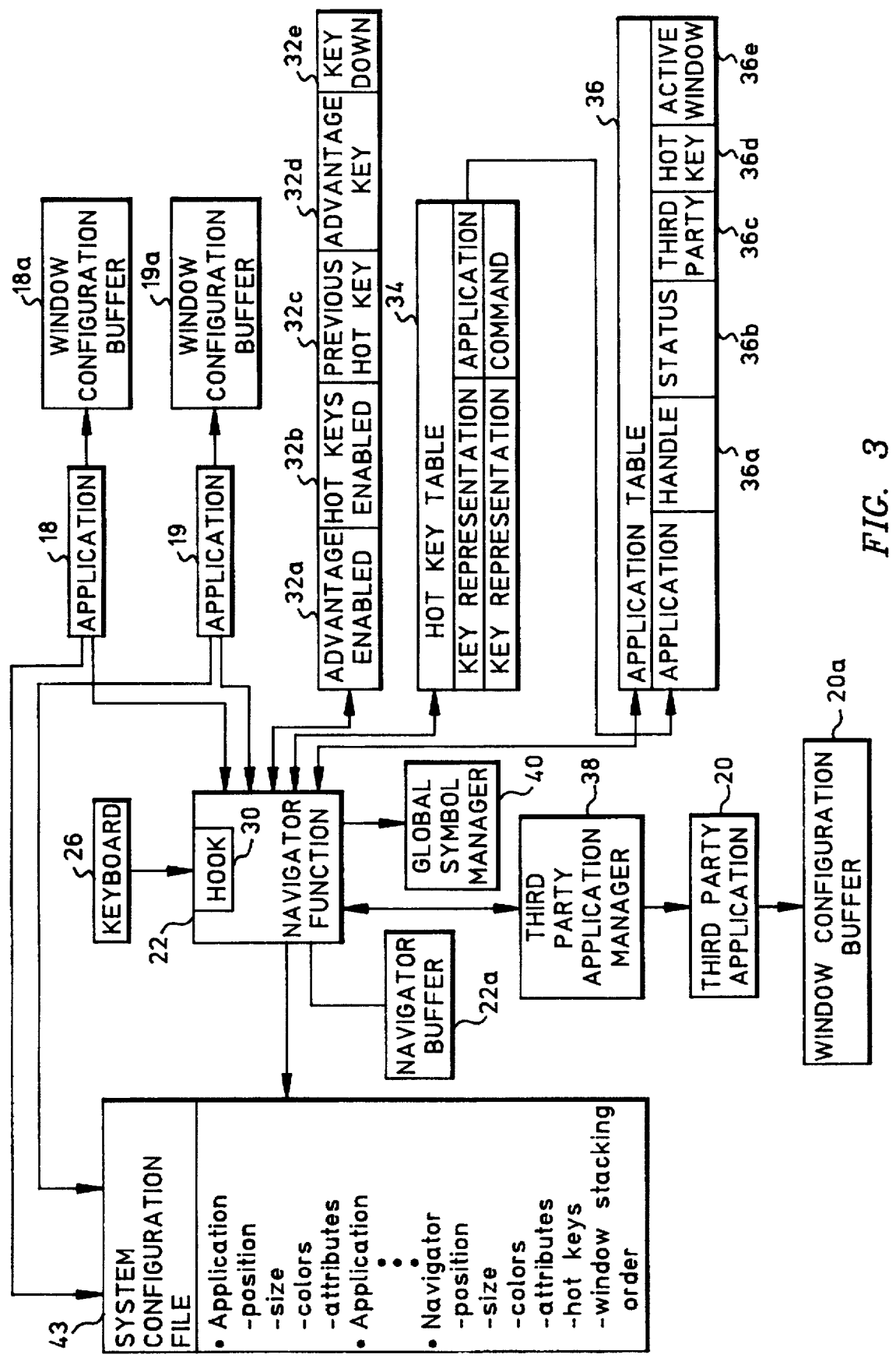
FIG. 3 is an illustration of the programming and data structures used in the invention.

FIG. 3 illustrates a set of functional entities and data structures used in the operation of the invention. The navigator function 22 is a software program written in the well-known C language and is compilable and executable on a DOS-based processor such as the processor 17 in FIG. 2. The navigator function 22 utilizes a macro instruction called a keystroke "hook" 30 which interfaces the navigator function 22 with the keyboard 26. The keyboard hook 24 filters and returns keystrokes generated by operation of the keyboard 26. This function can be understood with reference to the Programmer's Reference—Vol. 2: Functions, published by Microsoft Corporation (1987–1992) for the Microsoft Windows Operating System. The keystroke hook function 24 intercepts all input keys and passes them to a keyboard hook processing routine in the navigator function 22 for processing before they are passed to the applications.

As discussed in greater detail below, the keystroke hook function 30 enables the navigator function 22 to detect certain keystroke sequences in response to which the navigator function invokes certain actions. A flag structure 32 issued by the navigator function is used in the operation of the invention. The flag structure 32 is a conventional data object maintained in addressable storage space of the terminal 17. The flag structure 32 includes flag fields 32a–32e to detect and respond to certain keystrokes as explained later. The keystrokes which the navigator function detects are listed in a table 34 which is called the "hot key table". The hot key table 34 maintains a list of key representations. Each key representation includes one or more keyboard characters and is mapped by the hot key table 34 to a particular application program or to a function command. The navigator function 22 also maintains an application program table 36. Each record in the table 36 names an application and includes handle, status, third party, hot key, and active window fields 36a, 36b, 36c, 36d, and 36e, respectively. Each key representation in the hot key table 34 which maps to an application program includes a pointer (APP) to the entry in the application table 36 for that application program. In the context illustrated in FIG. 1, most applications which execute in the terminals are provided by the owner/operator of the National Computer Center 10. These applications utilize the National Computer Center data bases, provide the financial system services, and are referred to hereinafter as "system applications". System applications are listed in the application table. Other services available from third parties may be provided to the terminals either through the system structure 10, 12 of FIG. 1 or by the third party services 13. These third party services are supported by third party applications, such as the application 20, which are managed by a third party application manager 38 that co-executes with the navigator function 22 in a terminal. These applications, appropriately tagged as third party entities, are also listed in the application table 36. Third party programs may include, for example, the WORDS and XCELL programs available from Microsoft and the 1-2-3 spreadsheet program of Lotus. (WORDS and XCELL are trademarks owned by Microsoft; 1-2-3 is a trademark owned by Lotus.)

A global symbol manager 40 serves the navigator function 22 by maintaining a single global symbol input window from which a user can dispatch a symbol to one or more executing applications for retrieval of data without activation of each application's window.

The navigator function 22 also maintains a system configuration file 43. The system file is maintained for the purpose of establishing a set of window characteristics definitive of a set of system windows and is used as a point of reference in navigating through window configurations. The system configuration file maintains values for each window which are preselected by the user, or ordained by default, for window characteristics such as position, size, colors, and other attributes. In addition, each application (including the navigator function) maintains its own window configuration buffer which is used, when the application executes, to keep the current parameter values definitive of the current configuration of the application's window. Such buffers include window configuration buffers 18a, 19a, 20a, and 22a and are maintained in real memory. Further, the navigator entry in the system configuration file includes a list of "hot keys" which are used as described below and establishes the stacking order of windows displayed concurrently with the navigator window defined by the system configuration list.

Figure 4:
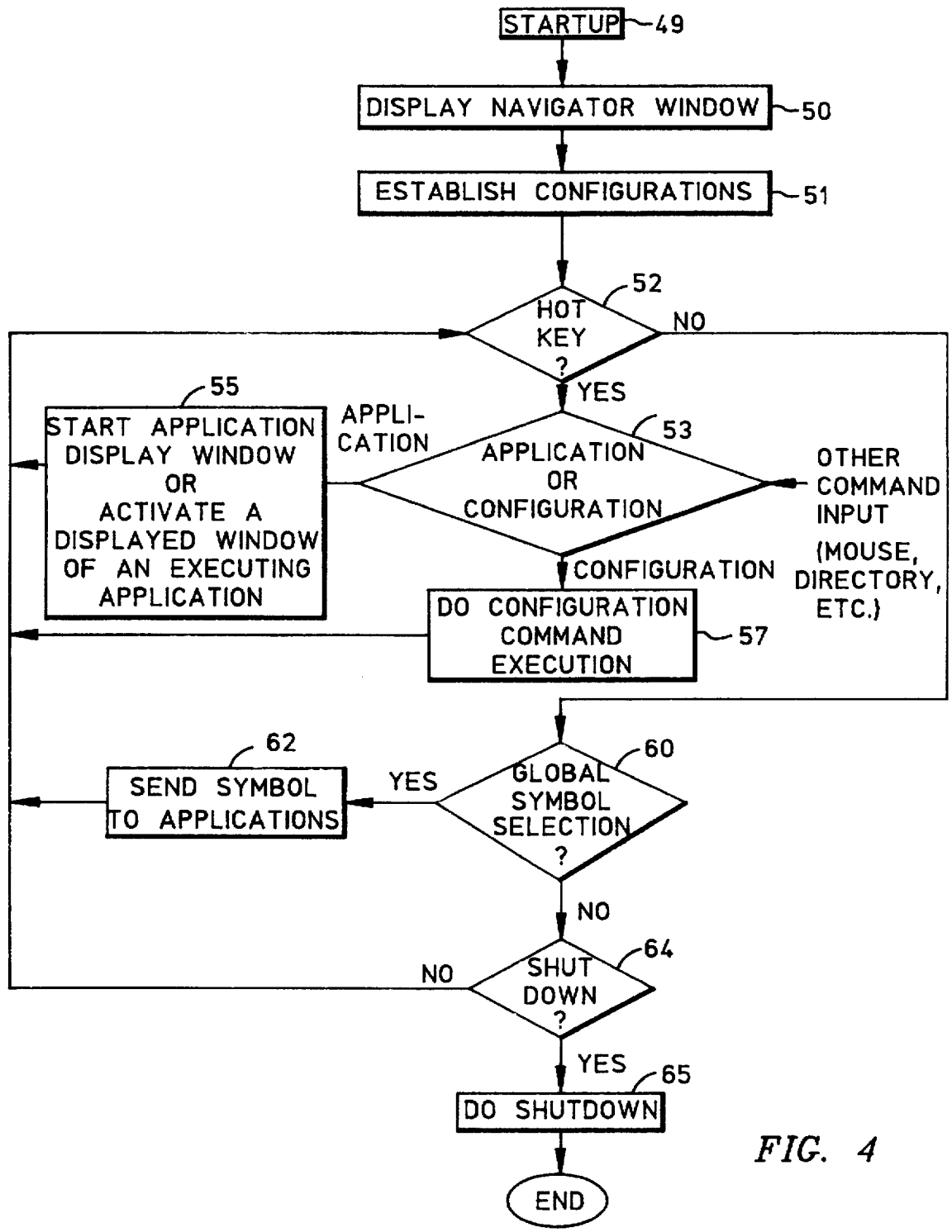
FIG. 4 is an overall flow diagram illustrating the principal functions of the invention.

Refer now to FIG. 4 which is an overall flow diagram illustrating the principal functions of the invention. After a conventional startup sequence in step 49, a default or predefined configuration in the navigator configuration file defines a navigator window which is displayed in step 50. As described below, the navigator window provides pull-down menus which enable a user to specify window configurations, including configuration of the navigator window. Window configuration is provided in step 51. In this regard, the window configuration buffers for the applications are loaded from the system configuration file or manually by the user from pull-down menu commands at the navigator window.

Figure 5:
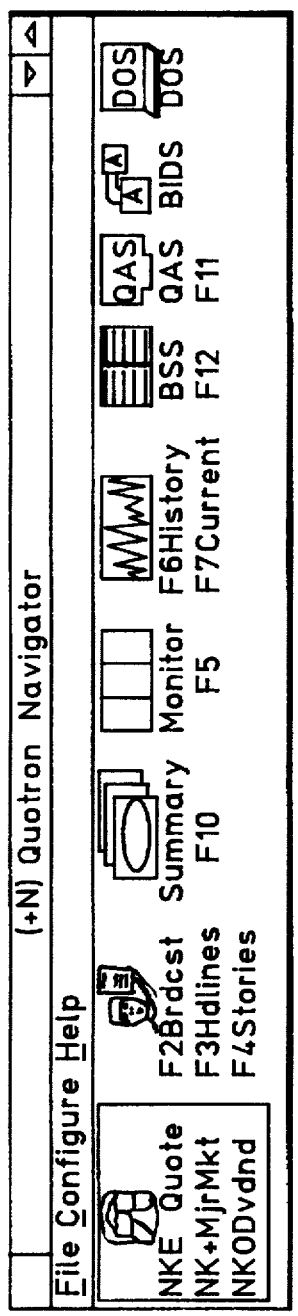
FIG. 5 is an illustration of a navigator window showing application program icons and key representations.

FIG. 5 illustrates a navigator window according to the invention. ("Quotron" is a registered trademark of the assignee corporation.) The navigator window includes a title bar, a menu bar, and a display container for displaying a plurality of icons. Each of the icons in the display container represents a particular application program which is available for execution on the terminal. Adjacent (below) each icon is a set of one or more logical application titles, each of which identifies a logical application within an application program that may be separately executed. As FIG. 5 shows, most applications have only a single logical application. However, the first icon illustrates a quotation application program which has Quote, Major Market (MjrMkt), and Dividend (Dvdnd) logical applications. Each logical application is referred to as a "function". Immediately adjacent to (under or beside) each function title is a key representation illustrating one or more keyboard characters. Under the icon of the ticker machine, the "Quote" function title is placed to the right of the key representation NKE (numeric keyboard "equals"). This is a single key representation. The F2 key representation adjacent the Brdcst function title under the second icon is also a single key representation. Under the DOS icon, the key representation '+D is a double key representation consisting of the apostrophe key followed by the D key. Each key of a key representation is referred to as a "hot key".

Thus, the navigation window of FIG. 5 displays in its display container a plurality of application icons, each application icon representing one or more logical applications and one or more key representations adjacent each icon, each key representation illustrating one or more keyboard characters and each key representation corresponding to an application program represented by the adjacent icon. The key representations shown in FIG. 5, when entered on a keyboard by a user, will activate a window for the corresponding executable. As will be explained in further detail below, hot keys are also provided for command execution. These hot keys are not displayed in the navigator window.

Returning to FIG. 4, once the window configurations have been established in step 51, the navigation function begins executing. During execution, keystrokes are captured by the keystroke hook 30 in FIG. 3 and passed to a keyboard hook processing routine for processing. If the processing determines that a keystroke or keystroke sequence includes a hot key, the positive exit is taken from decision 52. In decision 53, a detected hot key is identified as either an application hot key or a command hot key and the appropriate exit is taken. If the hot key is an application hot key, step 55 takes one of two actions. If the the executable associated with the hot key is not already running, the desired executable will be launched, its window will be displayed, and it will become the active task. Otherwise, if the executable associated with hot key is already running, but is not the current active task, its window will be activated. If the hot key is associated with a navigator command, the command is executed in step 57.

In series with the hot key loop, the navigator function executes a global symbol loop beginning with decision 60. In this regard, refer to FIG. 7 which illustrates a global symbol input window 199 that includes a field for entry of a symbol. The term "symbol" refers to any coded alphanumeric representation which is recognized and responded to by one or more executing system applications. The global symbol input window 199 of FIG. 7 includes a field 200 for entry of such a symbol, a "C" button 201 which can be "clicked" by a cursor to clear the current symbol, an upwardly-pointed arrow button 202 for selecting the next symbol in a list of symbols, and a downwardly-pointed arrow button 203 for selecting the previous symbol in a list of symbols. In addition, hot key commands are provided for selection of the global symbol input window and for dispatch of a symbol in the window to executing applications. The currently-executing system applications will respond appropriately to the dispatched symbol. The overall loop of FIG. 4 also tests for shutdown of the program in decision 64. If shutdown is detected, it is carried out in step 65 and the loop ends.

Application Navigation

FIGS. 6A–6D illustrate, respectively, navigator keyboard hook processing (FIGS. 6A and 6B), and keyboard message processing (FIGS. 6C and 6D) which are necessary to practice navigation through the applications according to the invention. As implied by these figures, the navigator function 22 of FIG. 3 is essentially a software entity composed of a plurality of routines, some of which are illustrated in the just-described figures and all of which operate concurrently by conventional message passing.

Refer now to FIGS. 3, 5, 6A, and 6B for an understanding of the keyboard hook processing logic. This logic employs the keystroke hook 30 of FIG. 3 using the hook function of the underlying user interface. The keyboard hook logic filters keyboard activity to identify hot keys. For application program execution and activation, the key representations shown in the navigator icon container of FIG. 5 can vary from one to two or more keystrokes. For example, the Quote executable maps to the hot key "NKE". Keyboard function keys can also be used for executable application key representation. For example, the Summary application is mapped in the navigator window to function key F10. In addition, hot keys may include keystroke combinations that are initiated by an escape-type key. For example, under the Bids application, two keystrokes—an apostrophe followed by I-form the hot key sequence.

Figure 6A:
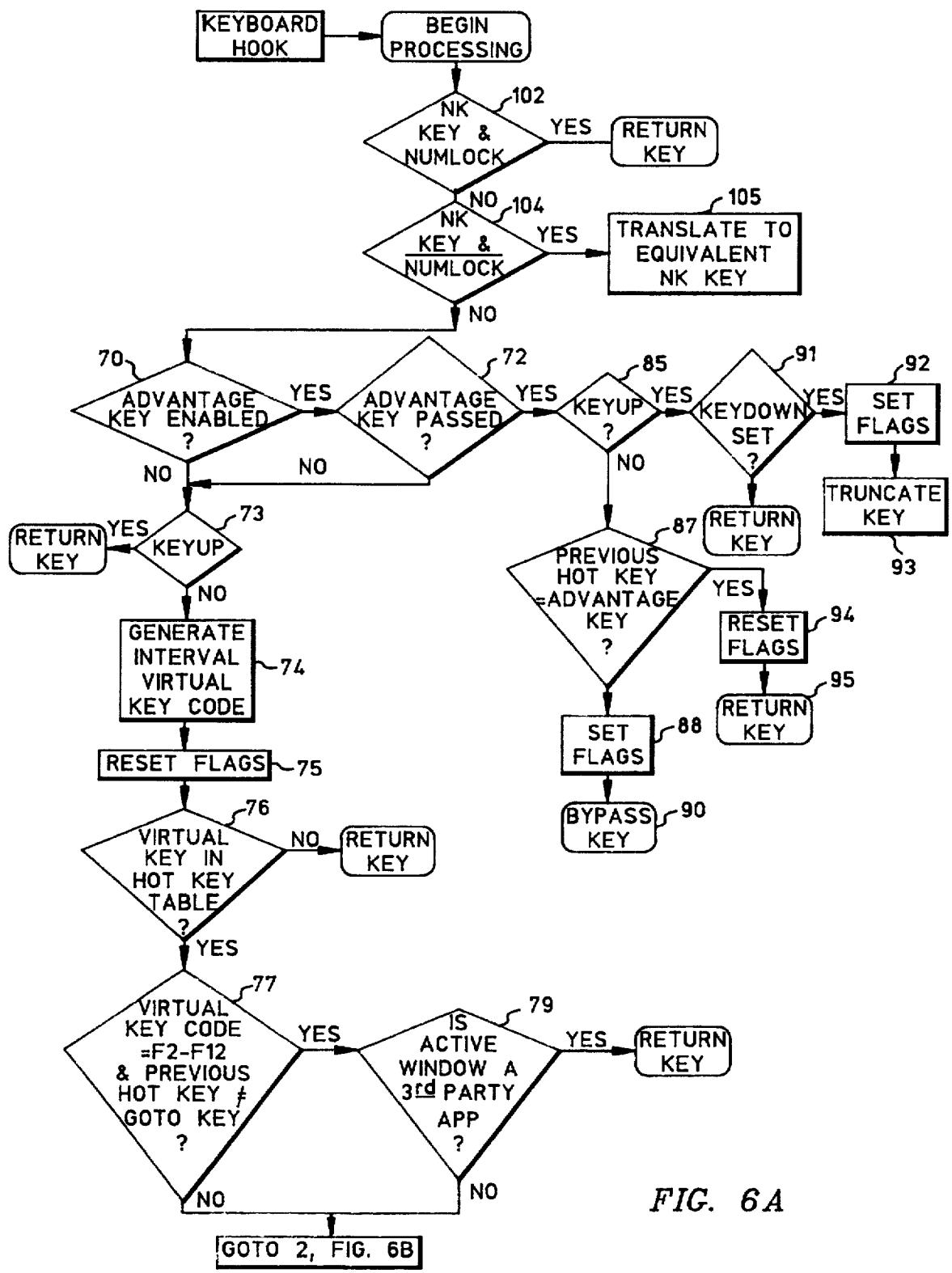
FIGS. 6A–6D are flow diagrams illustrating operation of key stroke navigation according to the invention.
Figure 6B:
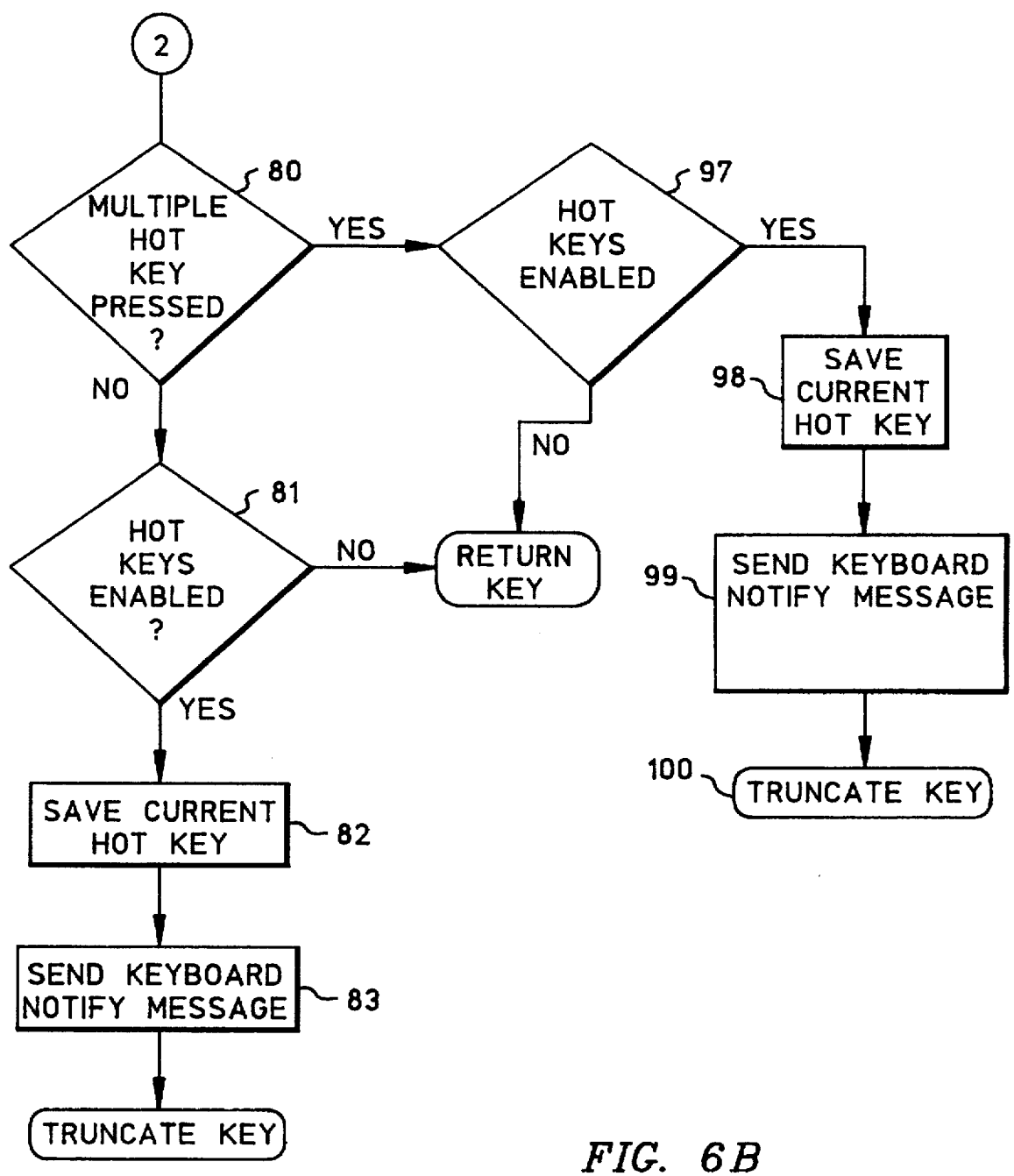

In FIGS. 6A and 6B, an escape-type key, the apostrophe in FIG. 5, for example, is denoted as the "Advantage" key. If the Advantage key is enabled for hot key coding, its corresponding flag in the flag structure 32 is set. Initially, in FIG. 6A, the keyboard hook processing logic returns a keystroke. Each keystroke generates two code sequences. The first code sequence is generated when the key is depressed. This is the "keydown" sequence which returns a keydown indication together with a code identifying the depressed key. When the key is released, a keyup code is sent together with a code identifying the released key.

Turning now to an explanation of the logic in FIGS. 6A and 6B, assume that the advantage key has been enabled, the "GoTo" key has not been depressed, and the user has depressed the F2 function key. The keyboard hook passes (keydown F2) to the logic of FIG. 6A which falls through decisions 102 and 104 to begin processing during decision 70. Since the advantage key has been enabled, the positive exit is taken from decision 70. Since the F2 key has been depressed, the negative exit is taken from decision 72. The input code was (keydown F2) )so the negative exit is taken from decision 73. In step 74, a virtual key code is generated for the F2 key, following which flags in the flag structure 32 are reset in step 75. Next, the hot key table of 34 of FIG. 3 is checked for the key code. If the code is not in the table, the key code is returned to the currently-active application. If the key code is in the hot key table, the keyboard code is checked in decision 77 to determine whether it is one of the keyboard function keys. In this case, the code is F2. Since the key code is F2, the previous key flag 32c is checked. If the previous key depressed was the GoTo key, the positive exit is taken from decision 77 and the application table 36 is inspected in step 79 to determine whether the currently-active application is a third party application. If so, the function key is returned to the application for processing. If the currently-active window is not a third party application or if the previous hot key was not the GoTo key, the process of FIG. 6A proceeds to decision 80, where the hot key table code entry is used to indicate whether the key is part of a multiple key sequence. Since F2 is a single key code for a news application (Brdcst), the negative exit is taken from this decision. In decision 81, flag 32c of FIG. 3 is inspected. If the flag is reset, the negative exit is taken from decision 81 and the keystroke is returned to the active application for processing. Otherwise, the positive exit is taken from decision 81, the hot key code is saved and flag field 32b of FIG. 3 in step 82, and a keyboard notify message signifying entry of a hot key (and including the key code) is dispatched to the appropriate navigator function routine in step 83. The routine is truncated by following the message.

Assume next that a multiple hot key sequence is entered. In the preferred embodiment, multiple hot key sequences are prefaced by the Advantage key (in this example, the ') and consist of two or more keys. This is not intended to so limit the practice of the invention; in fact, the number of keys in a multiple key sequence is limited only by design considerations. Assume that the keyboard hook returns (keydown, '). Assuming the Advantage key is enabled, the positive exit is taken from decision 70 and from decision 72. Since this is a keydown sequence, the negative exit is taken from decision 85 and the flag fields 32c, 32d, and 32e of the flag structure are set in step 88. The routine is exited in step 90 to await the next keystroke code. The next keystroke code is (keyup, ') which causes the routine to follow 70, 72, 85, and follow the positive exit from decision 85. In decision 91, since the keydown flag 32e was set, it is reset in step 92 and the routine is exited in 93.

At this point, the flag field 32c contains the code for ', and the Advantage key field 32d is set. It is noted that when the Advantage flag 32a is set to enable use of the Advantage key, the positive exit from decision 87 still permits the key to be used for other than hot key processing. The positive exit from step 87 implies that the Advantage key must be pressed twice in sequence for this purpose which will cause the positive exit to be taken from step 87, resulting in resetting of flags 32c, 32d, and 32e in step 93 and return of the Advantage key code to the currently-executing application in step 95.

Assume now that, following the sequence (keydown, '), (keyup, '), the keyboard hook returns (keydown, I). This will cause the routine to execute the sequence 70, 73, 74, 75, 76, 77, 80. In decision 80, the positive exit will be taken, the hot key's flag will be check in decision 97, and the appropriate exit taken. Assuming enablement of the hot key's flag, the current hot key is saved at step 98 in the key sequence, and (',I) is sent to the navigator function. Keyboard hook processing is truncated at step 100.

Returning to the beginning of the flow chart in FIG. 6A, the keyboard hook routine is enabled to detect hot key from a numeric keyboard (NK) by the sequence of decisions in 102 and 104. Essentially, if the NUMLOCK key is active, the key is returned to the active application without going further through the keyboard hook routine; otherwise, the key is translated at step 105 and evaluated as described above.

Figure 6C:
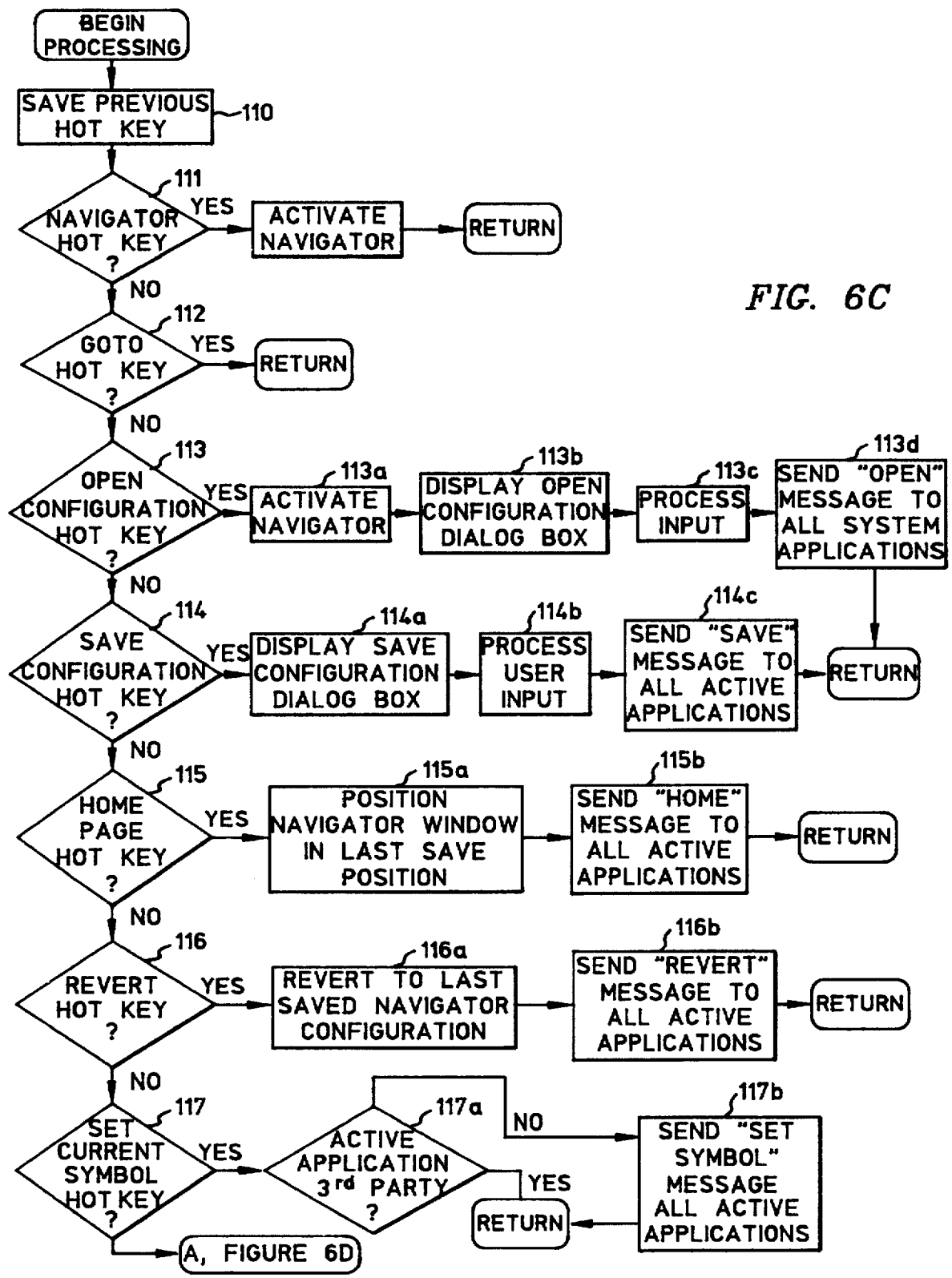
Figure 6D:
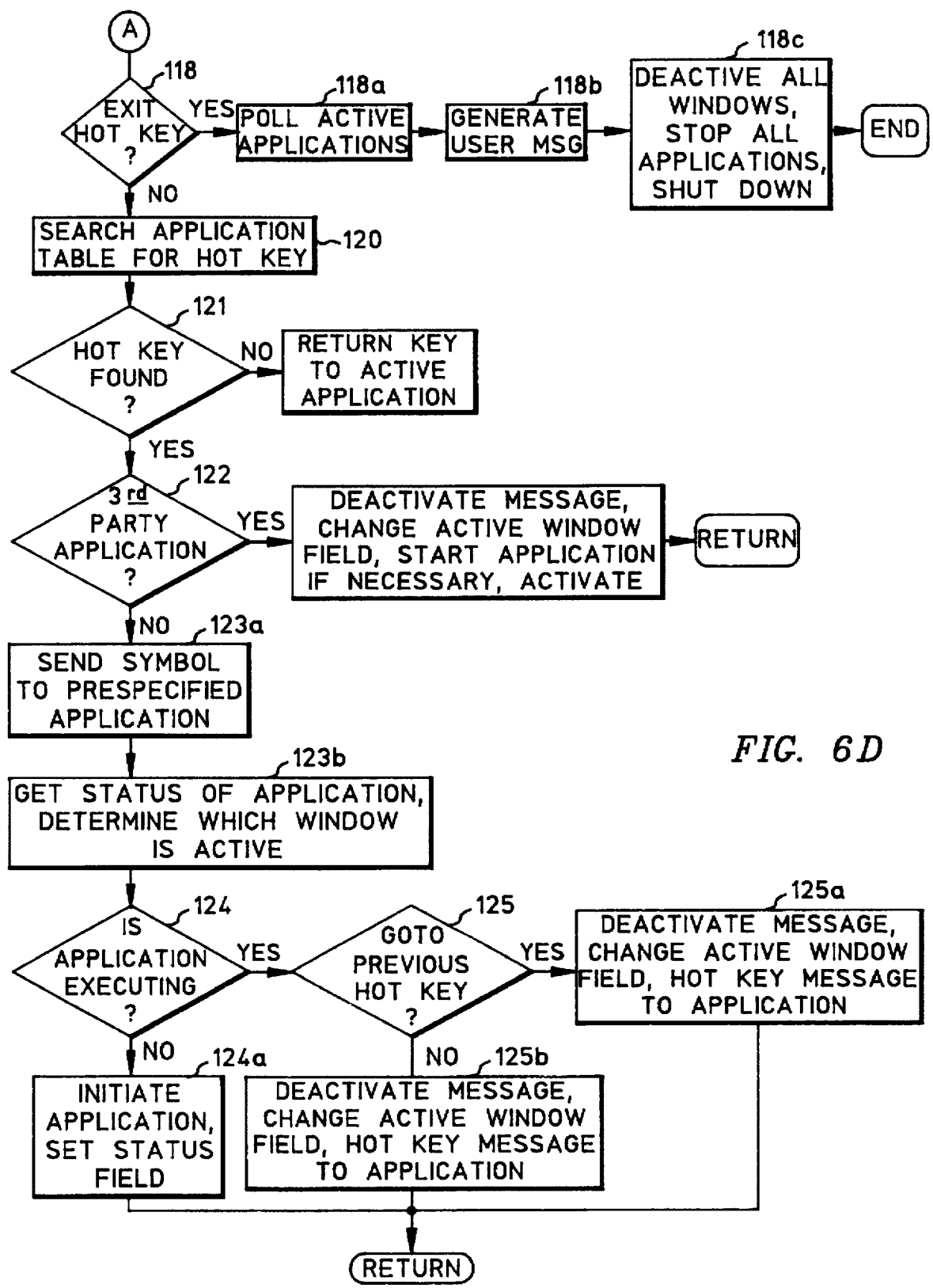

Keyboard hook messages generated by the routine illustrated in FIGS. 6A and 6B are processed by a navigator function routine which is illustrated in FIGS. 6C and 6D. Initially, if a hot key message is received, the navigator function saves the hot key code decision 110 and then executes a series of decisions 111–118 to determine whether the hot key is for activation of the navigator window (decision 111), is the GoTo hot key (112) or is a command hot key (decisions 113–118).

If the reported hot key is the navigator window hot key, the navigator window is activated. This would be done in order to gain access to the menu bar and pull down menus of the navigator window.

If a hot key is the GoTo hot key, the message processing routine simply returns to the keyboard hook processing routine and awaits the following message.

The functions of the hot keys signified by decisions 113 through 117 are described later in more detail.

Assuming that the message returned is an application hot key, the routine of FIGS. 6C and 6D will take the negative exits from the decisions 111–118 and determine which application is identified by the hot key in step 120. Preferably, this will be done by searching the "hot key" column of the application table 36. If no entry for the hot key is found in the application table 36, the routine takes a negative exit from decision 121 and returns the key code to the active application. Otherwise, the positive exit is followed and, in decision 122, the third party field of the record for the application is checked. If the application is a third party application, the navigator function 22 provides a message to the third party application manager 38 to initiate execution of the application or to activate the window of the application, if the application is currently executing.

If the application is not a third party application, the negative exit is taken from decision 122. In step 123a, the current symbol in the global symbol window (FIG. 7) is sent to a prespecified application if the prespecified application is executing. This will require the prespecified application to provide a response to the symbol on the assumption that the application which corresponds to the hot key is being accessed for the same reason. Preferably, the prespecified application is one which, for example, provides market quotation information, the assumption being that the hot key was entered to access the corresponding application for supplementary information. In step 123b, the application table is consulted to determine which is the currently active window and to determine the status of the application identified by the hot key. In decision 124, the navigator routine determines whether the application identified by the hot key is executing. If not, the application is started by dispatching a message to the application, its status field is set, and a window for the application is activated and the currently active window is deactivated. Relatedly, the configuration of the window for the application can be established from a record in the system configuration table or by use of commands described above. If the application is executing, the positive exit is taken from step 124 and the previous hot key field of the flag structure 32 in FIG. 3 is inspected to determine whether the previous hot key was the GoTo key. If so, a "hot key notify" message is sent to the executing application its window is activated, and the currently-active window is deactivated. Otherwise, the negative exit is taken from decision 125, the "hot key notify" message is sent together with the current symbol in the global symbol window to the application, and the currently-active window is deactivated.

Configuration Navigation

The system configuration file 43 is used as a reference for forward and backward navigation through window configurations. The system configuration file 43 provides a reference set of window configurations from which a user may navigate forwardly using the Open and Save configuration hot keys. Relatedly, the connections between the user interface and applications permit a user to dynamically amend window characteristics such as the position, size, stacking order, and so on. Accordingly the invention provides the Home Page and Revert hot keys to navigate backwardly from a changed window configuration to a configuration set in the system configuration file.

Configuration navigation according to the invention can be understood with reference to Table I, FIG. 3, and steps 113–116 of FIG. 6C.

In the preferred embodiment, the commands listed in Table I are executed by the navigator function in response to conventional user actions and also in response to user entry of a corresponding hot key. The first four commands are for configuration navigation according to the invention.

TABLE I

| Configuration Command | FIG. 6C Decision |
| --- | --- |
| Open Configuration | 113 |
| Save Configuration | 114 |
| Home Page | 115 |
| Revert Configuration | 116 |
| Set Current Symbol | 117 |
| Exit | 118 |

The Open Configuration command activates the navigator window (FIG. 5) in step 113a and displays a Configuration-Open dialog box in step 113b. Using the dialog box, the user establishes a new system configuration file. Using conventional means, application window characteristics are placed in the file. When the file is selected, its name and storage location are passed to all system applications for use to establish window configurations when the applications are launched.

The Save Configuration command causes the navigator function to save its current configuration from its buffer and the current configurations of the executing applications from window buffers into the current system configuration file 43. As shown in FIG. 6C, at the positive exit from decision 114 denoting identification of the Save Configuration hot key, a Save Configuration dialog box is displayed in step 114a. Preferably, the dialog box displays a field allowing the user to name the current configuration and provides means for processing the user's decision whether to save or not. Assuming the user's decision to save, in step 114b, the named configuration is updated by the current contents of all window buffers which are provided by the active application in response to a "save" message in step 114c.

As will be appreciated, the invention permits more than one configuration file to be stored, but uses only one named configuration file to establish the current configuration. Accordingly, in the discussion which follows, the system configuration file 43 will be referred to as the "current" system configuration file, implying that its contents establish the current configuration and that other noncurrent, system configuration files can exist.

The Home Page command in step 115a causes the navigator window to revert to the position and size specified for it in the current system configuration file 43. This command also causes a "home" message to be sent to all active applications in step 115b. In response to the "home" message, all active applications will also restore their windows to the positions and sizes specified in the current system configuration file 43. Thus, if the position and size parameter values in a window buffer differ from the corresponding values in the system configuration file, the file values are written to the buffer and the window is repositioned and resized accordingly.

The Revert Configuration command reverts the navigator window to the entire configuration specified for it in the current system configuration file 43 in step 116a and sends a "revert" message to all active applications in step 116b. In response to the revert message, all active applications will restore their windows to the complete configuration last saved in the current system configuration file 43 and the navigator function 22 will provide the window stacking order to the underlying user interface for appropriate stacking of the windows.

Both the Home Page and Revert commands restore the stacking order of windows which is found in the current system configuration file 43.

Symbol Navigation

Figure 7:
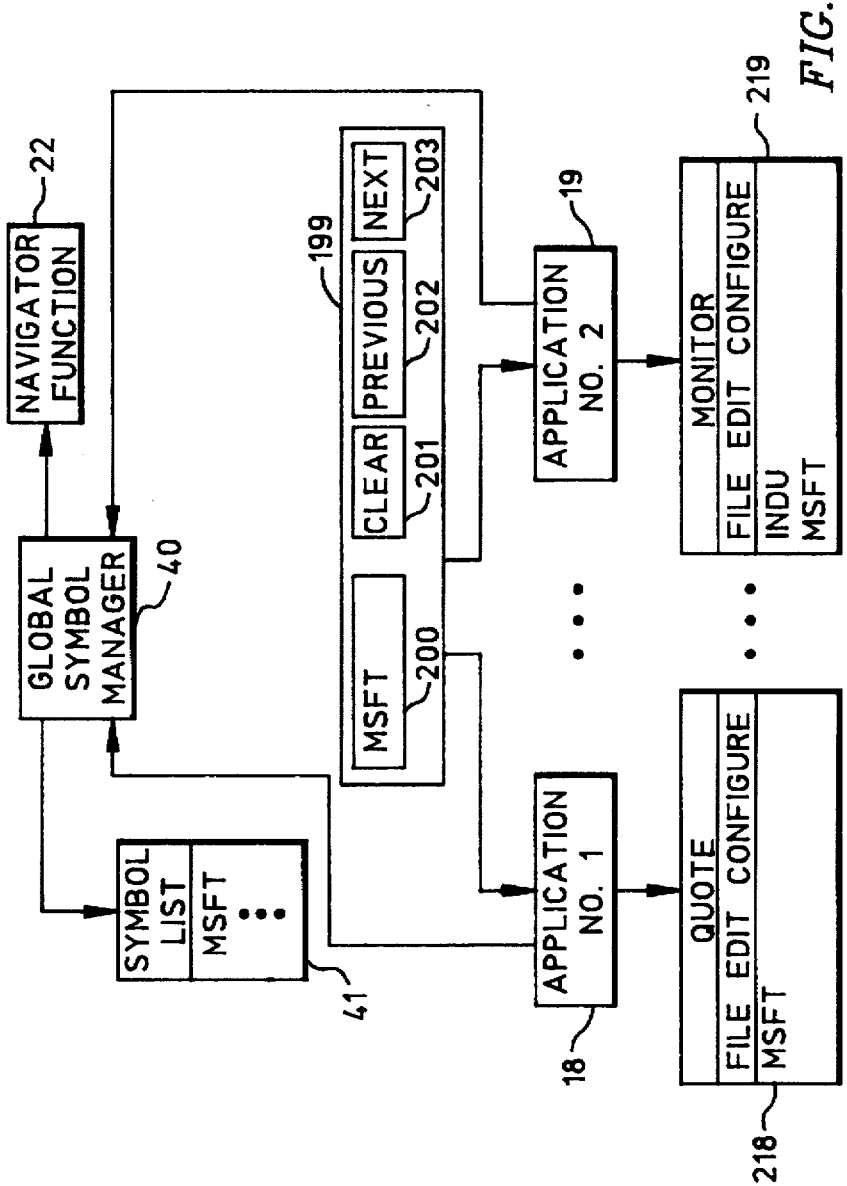
FIG. 7 is an illustration of a display screen showing a global symbol window.

FIGS. 3 and 7 illustrate the global symbol input window 199 and its interconnections with the navigator function 22. The global symbol input window is a top-level window which exists by virtue of the global symbol manager 40, where the global symbol manager is an application which executes concurrently with other system and third party applications. The global symbol manager 40 maintains a symbol list 41 containing prespecified symbols. For example, the symbols in the symbol list 41 can comprise a set of commonly-accepted stock symbols, each of which identifies a business enterprise whose securities are included in the database at the national computer center 10. The symbols are conventional and are used in, for example, the assignee corporation's Advantage Services system. Assuming that the system applications include an application which provides security transaction information, an application which provides market data, and an application which provides financial and market news, the advantage service system of the assignee corporation includes means in corresponding applications which provide responses from those applications to symbols in the symbol list.

With this understanding, it will be appreciated that the architecture of FIGS. 2, 3, and 7 is particularly appropriate to terminals used by securities brokers in brokerage firm offices. In such an application environment, when a broker wishes to make a buy/sell decision with regard to a particular financial instrument, it is useful to have the most current information regarding transaction activity, market activity, and news stories relevant to the instrument. These are provided through the system applications. The global symbol input window provides an extraordinarily efficient means of eliciting such information with a minimum of keystrokes or clicks. In this regard, depending on the invocation procedure, the symbol in the current symbol field 200 can be dispatched to elicit response from one or more of the system applications as a consequence of a single user action. Relevantly, assume that a symbol has been entered into the symbol field 200 and that applications 18 and 19 corresponding, respectively, to a securities quotation (Quote) application and a market activity monitoring (Monitor) application are executing, with the application 18 providing the window 218 and the application 19 the window 219. Assume that the user requires information regarding a corporation identified by the symbol MSFT. According to the invention, the user enters the symbol into the current symbol field 200 and dispatches the symbol. The symbol is dispatched from the window 199 to the application 18 and the application 19. Response to the symbol is provided from the applications 18 and 19 through windows 218 and 219, respectively. Thus, the invention provides the user with the ability to obtain response to to a symbol from a plurality of applications with a single symbol entry action through an executing application (the global symbol manager), and without regard to which window is currently active.

In the invention, there are three ways to enter symbols into the window 199 and four ways to dispatch symbols from to executing applications. For symbol entry, it is asserted that a hot key and other, conventional, means are provided for activation of the global symbol input window. Activation of the global symbol input window will dispatch key strokes entered at the keyboard to the window through its manager. Alternatively, if the window is not active keystrokes are forwarded from an active system application to the global symbol manager by message-passing. Symbol filtration can be done either at the system application or at the global symbol manager. If filtration is done at the system application, of course each application will be provided with access to the symbol list 41. Last, three buttons, 201, 202, and 203 are provided in the global symbol window 199 for symbol entry. The Clear button 201 clears the current symbol from the field 200. The Previous button 202 restores the previous current symbol from the symbol list 41 to the field 200, while the Next button 203 restores the next current symbol from the symbol list 41.

A symbol can be dispatched from the global symbol window 199 in response to the Enter key on the keyboard or in response to hot key activation for the Set Current Symbol command. In this latter regard, the Set Current Symbol command would be dispatched from the navigator function 22 to the global symbol manager 40. The Set Current Symbol command (steps 117–117b in FIG. 6C) causes the symbol which is displayed in the global symbol input window to be transmitted to the application whose window is currently activated, providing that application is not a third party application. If a third party application window is currently active, no action is taken. Symbol dispatch during application hot key processing has already been described in the message handling routine illustrated in FIGS. 6C and 6D. For example, in step 123, the current symbol in the global symbol window 199 is dispatched to a prespecified application. In the preferred embodiment and best mode contemplated by the applicants, the prespecified application corresponds to the Quote application 18 of FIG. 7. Thus, each time an application hot key (or hot key sequence) is entered, the current symbol in the window 199 is sent to the Quote application and transaction information is elicited from the application. Further, in the negative exit from decision 125 of FIG. 6D, the current symbol is also dispatched to the application being activated, as well as the quote application. The fourth mode of symbol transmission occurs when a sequence of keystrokes is identified by a system application or the global symbol manager as one of the symbols in the list 41. In this case, identification of the symbol would result in its being dispatched to executing system applications.

System Operation

The operational sequence employed in the practice of the invention includes navigator function start-up, operation, and shutdown. During operation, the invention supports application navigation, configuration navigation, and global symbol navigation. Initially, the navigator function 22 may be set up to start automatically when the user interface itself is started, or it may be started from a program manager using conventional means and methods. When beginning, the navigator function and its window will be activated and the current SYSTEM configuration file 43 will be consulted, either as a result of a quick sign-on process or at the direction of the user. Using the system configuration file 43, the navigator function 22 starts up the applications listed in the file and launches their corresponding windows according to the values found in the file. Conventional dialog means may be used to establish the system configuration file, if empty, upon start-up of the navigator function in response to a default navigation configuration.

During operation of the navigator function, one or more icons will be provided in the display container (FIG. 5), each with one or more key representations corresponding to hot keys which will activate the executables as described above. The keyboard hook routine of FIGS. 6A and 6B intercepts and filters each keystroke. When a hot key is detected during normal use of the keyboard, the navigator function executes the appropriate action. Thus, if the hot key is an application hot key, the corresponding application will be initiated, if necessary, and its window will be activated. If the hot key is a command hot key, the navigator function will execute the appropriate action.

Other means are also provided for hot key activation, for example, in the preferred embodiment, when the navigator window is active, the text of one of the key representations and its associated executable title will be highlighted. The user may employ the "tab" and "shift-tab" keys to move the highlighting forward and backward among the key representations and also to move between icons in the display container. A highlighted key representation can be dispatched when the user presses the "Enter" key, in which case the appropriate action will be executed as described above. In the preferred embodiment, the mouse can also be employed to select a key representation and a double-click will have the same effect as pressing the "Enter" key. In the preferred embodiment, applications can also be started in a stand-alone fashion, in which case the navigator function will not manage their configuration, and they will not be taken into consideration in the navigation procedures described above. In the preferred embodiment, the navigator function does not manage DOS applications running under the user interface.

Figure 8A:
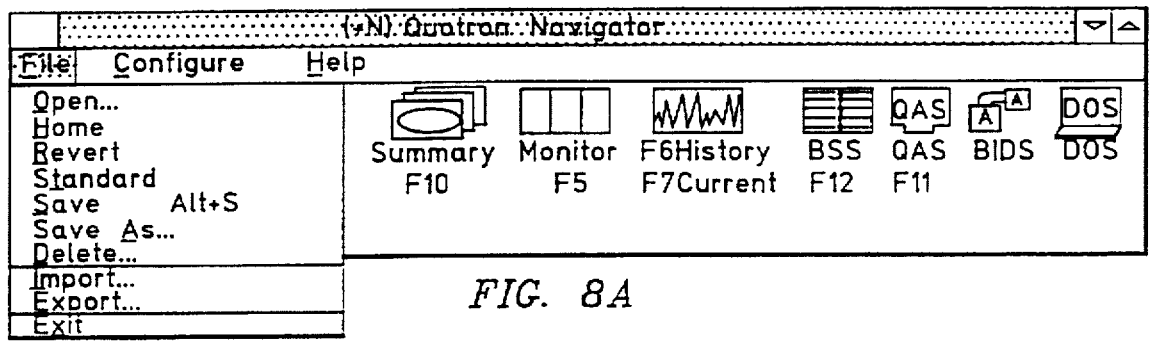
FIGS. 8A–8D illustrate a sequence of windows showing navigation through application window configuration control according to the invention.

During operation, the menu bar of the navigator window illustrated in FIG. 5 operates conventionally to provide pull-down menus under each of the menu bar entires. The pull-down menu under the File entry is illustrated in FIG. 8A. In this menu, the Open selection causes a Configuration-Open dialog box to appear which the user can employ for start-up operations, including system configuration selection. The Home, Revert, and Save menu items can be selected conventionally to operate as described above.

Figure 8B:
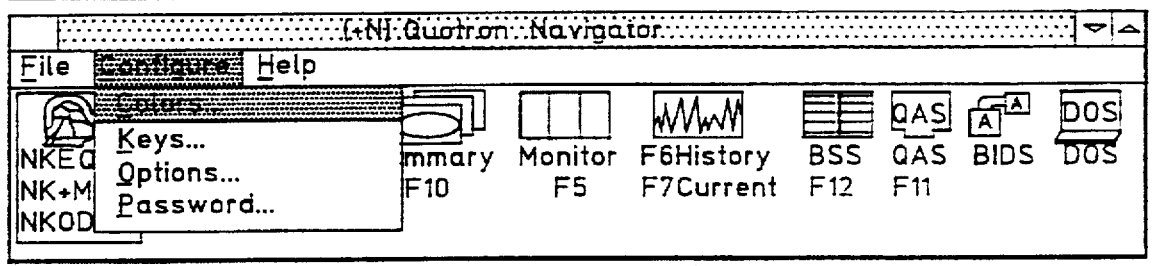

FIG. 8B illustrates the pull-down menu under the Configure entry in the navigator window. In this menu, the Colors selection generates a color selection dialog box which allows the user to establish window colors for the applications, as well as the navigator window's background color, title color, and hot key colors. The results are placed in the system configuration file, with the application window color changes being broadcast to the applications. The Keys menu item allows the user to change and add hot key assignments for applications and commands. The results are placed in the system configuration file and the hot key and application tables. The hot key dialog box is illustrated in FIG. 8D. In FIG. 8D, the Use Hot Keys button sets the hot keys enabled flag 32b of FIG. 3, while the Advantage button sets the advantage enabled field 32a.

Figure 8C:
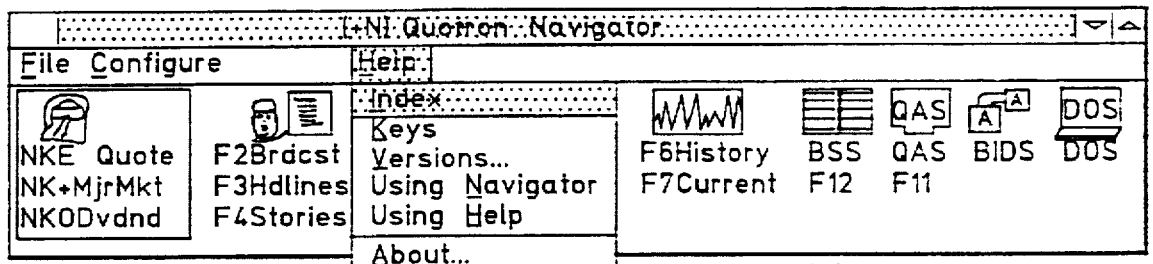
Figure 8D:
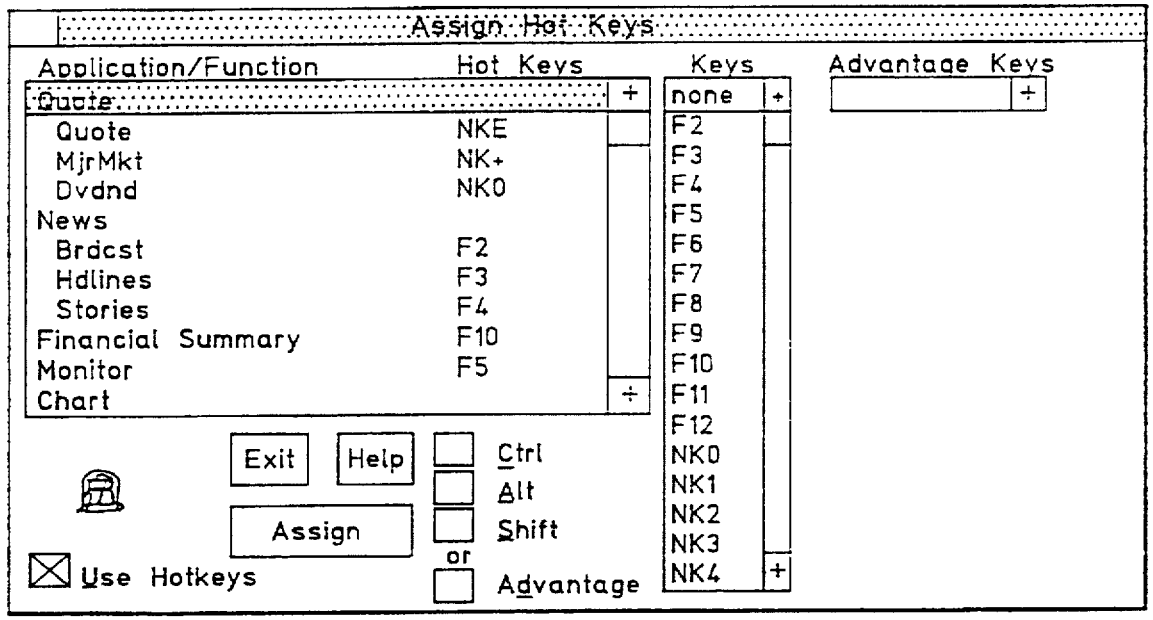

FIG. 8C illustrates the pull-down menu under the Help menu item in the navigator window.

The Exit command under the File pull-down menu (FIG. 8A) initiates shut-down of the navigator function. Refer now to steps 118 through 118c of FIG. 6D. The Exit command causes the navigator function 22 to poll all executing applications to see if they can be shut down. If all currently-executing applications respond positively, the navigator function will provide a message to the user offering to save the current system configuration file 43, and does so if the user responds "yes". Then, the navigator function will issue an order to all system applications to close. When closure of all executing system applications has been confirmed, the navigator function will close itself.

While we have described several preferred embodiments of our navigator function, it should be evident that modifications and adaptations thereof will occur to persons skilled in the art. In particular, the skilled artisan will realize that care must be given to selection of hot keys. Generally, keys should be selected with care because so many are already used by many applications. Thus, the use of the Advantage key with another key to generate a unique combination not used by other applications is preferred. A single hot key should be selected only if the key is rarely used within any application. Therefore, the protection afforded our invention should only be limited in accordance with the scope of the following claims.

We claim:

1. A method of application program navigation in a computer system that includes a digital data processor, a video screen coupled to the processor, and a user interface coupled to the processor, said method comprising the steps of:

continuously displaying upon the video screen a navigator window containing multiple icons, each icon appearing proximate at least one representing keystroke sequence, each icon corresponding to a particular application program;

receiving entry of a first one of the keystroke sequences at the processor via the user interface, said first keystroke sequence denoting a first application program;

in response to the first keystroke sequence entry, determining whether the processor is already running the first application program;

if the first application program is not already running, initiating the first application program;

continuing to display the navigator box and in response to the first keystroke sequence entry additionally displaying on the video screen separately from the navigator window a first application window containing data generated by the first application program;

receiving entry of a second one of the keystroke sequences at the processor via the user interface, said second keystroke sequence being associated with a second application program;

in response to the second keystroke entry, determining whether the processor is already running the second application program;

if the second application program is not already running, initiating the second application program;

continuing to display the navigator window and in response to the second keystroke entry displaying on the video screen separately from the navigator window and the first application window a second application window containing data generated by the second application program;

displaying a global symbol input window for specifying application program symbol inputs;

entering an alphanumeric symbol into the global symbol input window;

dispatching the symbol using the global symbol input window;

the dispatching step including forwarding the symbol to each running application program as an input thereto; and displaying in open application windows the responses of corresponding applications to the symbol.

2. A method for application program navigation for use in an interactive computer system with a keyboard, a video display, and a directly-manipulated, menu-driven user interface having means for supporting execution of one or more application programs in a plurality of application programs and output means for confining the display of application program execution to a particular window on the video display, said method comprising the steps of:

continuously displaying upon the video display a navigation window for specifying a plurality of application programs;

simultaneously displaying a plurality of application icons in the navigation window, each application icon representing an executable application program;

displaying one or more key representations adjacent to each icon in the navigation window, each key representation including one or more keyboard characters and each key representation corresponding to an application program represented by the adjacent icon;

entering a first key representation by striking one or more keys on the keyboard, said first key representation corresponding to a first application program;

in response to entry of the first key representation, performing steps comprising:
  determining whether the first application program is already running;
  if the first application program is not already running, initiating the first application program;
  continuing to display the navigator window while additionally displaying on the display separately from the navigator window a first application window containing data generated by the first application program;

entering a second key representation by striking one or more keys of the keyboard, said second key representation corresponding to a second application program;

in response to the second key representation, performing steps comprising:
  determining whether the processor is already running the second application program;
  if the second application program is not already running, initiating the second application program; and
  continuing to display the navigator window while additionally displaying on the display separately from the navigator window and first application window a second application window containing data generated by the second application program;

displaying a global symbol input window for specifying application program symbol inputs;

entering an alphanumeric symbol into the global symbol input window;

dispatching the symbol using the global symbol input window;

the dispatching step including forwarding the symbol to each running application program as an input thereto; and displaying in open application windows the responses of corresponding applications to the symbol.

3. A method for navigating functions in a computer system including a CPU, a video screen coupled to the CPU, and a keyboard coupled to the CPU, said method comprising:
  continuously displaying upon a video screen a navigator window with multiple icons and corresponding keystroke sequences;
  entering keystroke sequences associated with multiple applications;
  opening windows associated with the applications while continuing to display the navigator window;
  displaying a global symbol input window for specifying application program symbol inputs;
  entering an alphanumeric symbol into the global symbol input window;
  dispatching the symbol using the global symbol input window;
  the dispatching step including forwarding the symbol to each running application program as an input thereto; and
  displaying in open application windows the responses of corresponding applications to the symbol.

4. An apparatus for application program navigation, comprising:
  a video screen;
  a user interface; and
  a digital data processor, coupled to the video screen and user interface and programmed for:
    continuously displaying upon the video screen a navigator window containing multiple icons, each icon appearing proximate at least one representing keystroke sequence, each icon corresponding to a particular application program;
    receiving entry of a first one of the keystroke sequences at the processor via the user interface, said first keystroke sequence being associated with a first application program;
    in response to the first keystroke entry, determining whether the processor is already running the first application program;
    if the first application program is not already running, initiating the first application program;
    continuing to display the navigator window and in response to the first keystroke entry additionally displaying on the video screen separately from the navigator window a first application window containing data generated by the first application program;
    displaying a global symbol input window for specifying application program symbol inputs;
    entering an alphanumeric symbol into the global symbol input window;
    dispatching the symbol using the global symbol input window;
    the dispatching step including forwarding the symbol to each running application program as an input thereto; and
    displaying in open application windows the responses of corresponding applications to the symbol.

5. An apparatus for application program navigation, comprising:
  a video display;
  a keyboard; and
  a digital data processor, coupled to the video screen and user interface and programmed for:
    continuously displaying upon the video display a navigation window for specifying a plurality of application programs;
    simultaneously displaying a plurality of application icons in the navigation window, each application icon representing an executable application program;
    displaying one or more key representations adjacent to each icon in the navigation window, each key representation including one or more keyboard characters and each key representation corresponding to an application program represented by the adjacent icon;
    entering a first key representation by striking one or more keys on the keyboard, said first key representation corresponding to a first application program;
    in response to entry of the first key representation, performing steps comprising:
      determining whether the first application program is already running;
      if the first application program is not already running, initiating the first application program; and
      continuing to display the navigator window while additionally displaying on the display separately from the navigator window a first application window containing data generated by the first application program;

entering a second key representation by striking one or more keys of the keyboard, said second key representation corresponding to a second application program;

in response to the second key representation, performing steps comprising:

determining whether the processor is already running the second application program;

if the second application program is not already running, initiating the second application program;

continuing to display the navigator window while additionally displaying on the display separately from the navigator window and first application window a second application window containing data generated by the second application program;

displaying a global symbol input window for specifying application program symbol inputs;

entering an alphanumeric symbol into the global symbol input window;

dispatching the symbol using the global symbol input window;

the dispatching step including forwarding the symbol to each running application program as an input thereto; and displaying in open application windows the responses of corresponding applications to the symbol.

6. An apparatus for application program navigation, comprising:

a video screen;

a user interface; and a digital data processor, coupled to the video screen and user interface and programmed for:

continuously displaying upon a video screen a navigator window with multiple icons and corresponding keystroke sequences;

entering keystroke sequences associated with multiple applications;

opening windows associated with the applications while continuing to display the navigator window;

displaying a global symbol input window for specifying application program symbol inputs;

entering an alphanumeric symbol into the global symbol input window;

dispatching the symbol using the global symbol input window;

the dispatching step including forwarding the symbol to each running application program as an input thereto; and displaying in open application windows the responses of corresponding applications to the symbol.

* * * * *